United States Patent
Lynn et al.

(10) Patent No.: US 9,544,746 B2
(45) Date of Patent: Jan. 10, 2017

(54) DYNAMIC WEB CONTENT VIA CONTEXTUALLY AWARE TEXT MESSAGING

(71) Applicant: Verizon Patent and Licensing Inc., Arlington, VA (US)

(72) Inventors: Ian Lynn, San Leandro, CA (US); Lodema Margaret Steinbach, Clayton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 22 days.

(21) Appl. No.: 14/584,192

(22) Filed: Dec. 29, 2014

(65) Prior Publication Data

US 2016/0192161 A1    Jun. 30, 2016

(51) Int. Cl.
H04L 29/06 (2006.01)
H04W 4/14 (2009.01)
H04W 4/16 (2009.01)
H04M 1/725 (2006.01)

(52) U.S. Cl.
CPC .......... *H04W 4/14* (2013.01); *H04M 1/72552* (2013.01); *H04M 1/72561* (2013.01); *H04W 4/16* (2013.01); *H04L 29/06* (2013.01)

(58) Field of Classification Search
CPC ............... H04W 4/14; H04M 1/72552; H04M 1/72561; G06Q 30/02
USPC ......... 455/414.3, 456.1, 412.1; 709/218, 204
See application file for complete search history.

(56) References Cited

U.S. PATENT DOCUMENTS

| | | | |
|---|---|---|---|
| 2005/0043043 A1* | 2/2005 | Winn | H04L 29/06 455/456.5 |
| 2008/0071620 A1* | 3/2008 | Lowe | G06Q 30/02 705/14.54 |
| 2008/0171555 A1* | 7/2008 | Oh | G01C 21/20 455/456.1 |
| 2008/0233981 A1* | 9/2008 | Ismail | H04L 51/20 455/466 |
| 2010/0064007 A1* | 3/2010 | Randall | G06Q 30/02 709/204 |
| 2010/0094878 A1* | 4/2010 | Soroca | G06F 17/30035 707/748 |
| 2010/0261454 A1* | 10/2010 | Shenfield | G06Q 30/02 455/412.1 |
| 2011/0210907 A1* | 9/2011 | Martin-Cocher | G06F 17/30905 345/1.3 |
| 2011/0300837 A1* | 12/2011 | Misiag | G06F 17/30887 455/414.2 |
| 2011/0320960 A1* | 12/2011 | Cai | H04L 12/5805 715/752 |

(Continued)

FOREIGN PATENT DOCUMENTS

WO    WO 2006/052837    *    5/2006    ............. G06Q 99/00

*Primary Examiner* — Mong-Thuy Tran

(57) ABSTRACT

A system may provide dynamic web-based content in conjunction with text message content. A user may use text messages to interact with web content (e.g., to select hyperlinks, request information, provide information, etc.). A content server may process the text messages, sent by the user, in order to determine web content to provide to the user. The text messages may be authenticated by a message relay server, thereby eliminating the need for the content server to request authentication or identification information from the user.

20 Claims, 20 Drawing Sheets

(56) References Cited

U.S. PATENT DOCUMENTS

| | | | |
|---|---|---|---|
| 2012/0138671 A1* | 6/2012 | Gaede | G06Q 20/32 235/375 |
| 2012/0284782 A1* | 11/2012 | Karim | G09C 5/00 726/6 |
| 2013/0144674 A1* | 6/2013 | Kim | G06Q 30/0207 705/7.19 |
| 2014/0115711 A1* | 4/2014 | Stevenson | H04L 29/06 726/26 |
| 2014/0129963 A1* | 5/2014 | Portale | H04L 65/403 715/753 |
| 2014/0135069 A1* | 5/2014 | Jung | G06F 3/041 455/566 |
| 2015/0074191 A1* | 3/2015 | Feng | H04L 67/26 709/204 |

* cited by examiner

| MDN | URL |
|---|---|
| 1234 | www.foo.com |
| 5678 | www.bar.com |
| ... | ... |
| 9012 | www.foo.org |

# US 9,544,746 B2

1

DYNAMIC WEB CONTENT VIA CONTEXTUALLY AWARE TEXT MESSAGING

BACKGROUND

"Text" messaging (such as Short Message Service ("SMS") message or Multimedia Messaging Service ("MMS") messages) is a useful technique that allows mobile telephones to send and receive information. Businesses often use text messages to provide notifications to users, such as flight status notifications, delivery status notifications, sports scores, and/or other types of information. Businesses also sometimes use web content, such as web pages, to provide information to users. Text messaging and web content are generally accessed, by users, via separate interfaces (e.g., a messaging application for text messaging, and a web browser application for accessing web pages).

DETAILED DESCRIPTION OF PREFERRED EMBODIMENTS

The following detailed description refers to the accompanying drawings. The same reference numbers in different drawings may identify the same or similar elements.

Some implementations, describe herein, may provide an enhanced messaging/web content presentation application

2

(herein simply referred to as an "enhanced messaging application"), via which a user device (such as a mobile telephone) may present dynamic web content based on text messages sent by the user device. The enhanced messaging interface may allow content providers (e.g., businesses, advertisers, sports teams, etc.), to provide rich content to users, along with flexible options for users to interact with the content (e.g., users may interact with web content by sending text messages in addition to, or in lieu of, selecting "links" in the web content). The enhanced messaging interface may enhance the user experience, as some users may prefer to type input, as opposed to other forms of interaction (e.g., selecting menu items, clicking buttons, etc.). Further, since text messaging techniques may be used, authentication of the user device may be performed without requiring the user to provide user names, password, etc., thereby further enhancing the user experience (e.g., the back end of a wireless network may perform authentication based on received text messages).

Figure 1A:
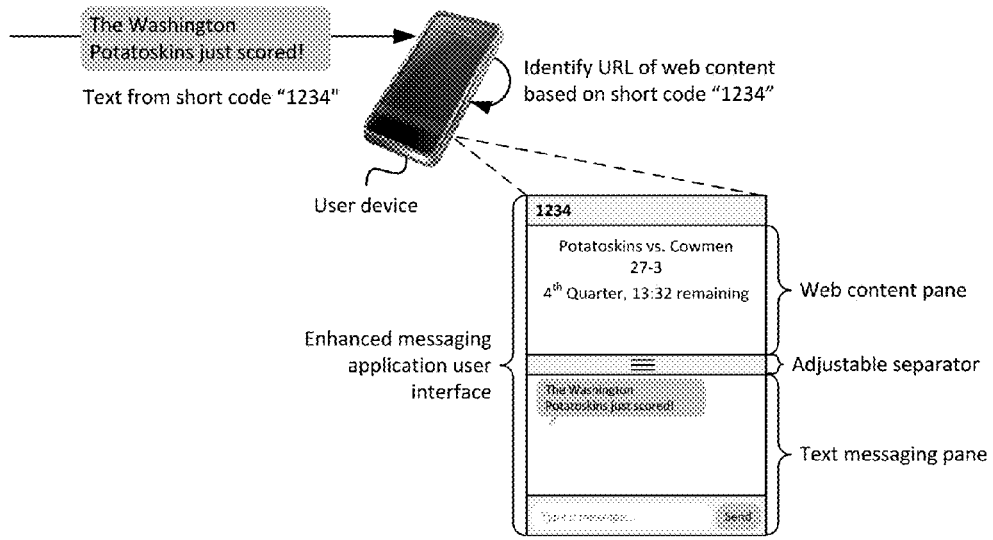
FIGS. 1A and 1B illustrate an example overview of implementations described herein, in which an enhanced messaging application may be used to provide dynamic web content in conjunction with a text messaging interface.
Figure 1B:
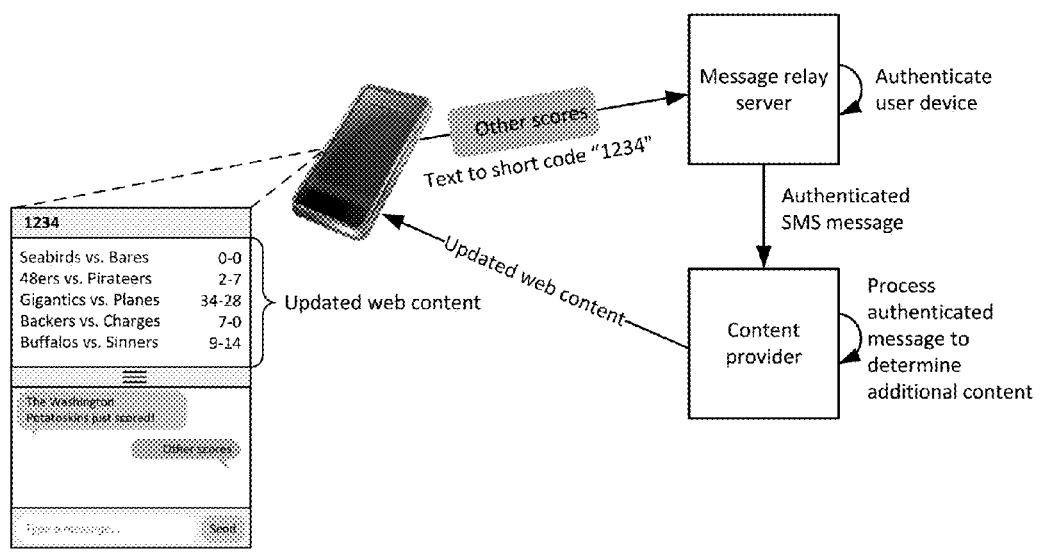

FIGS. 1A and 1B illustrate an example overview of one or more implementations, provided herein. As shown in FIG. 1A, a user device may receive a text message (e.g., an SMS message or an MMS message). The text message may be sent by a content provider based on a previous registration of the user device to receive text messages. For example, a user of the user device may have registered to receive score updates for a sporting event, and the received text message ("The Washington Potatoskins just scored!") may correspond to a score update.

In this example, the content provider (i.e., the sender of the text message) may be associated with the example messaging short code (e.g., a telephone number that is shorter than a traditional telephone number) "1234." Upon receiving the text, the user device (e.g., an enhanced messaging application running on the user device) may determine that the short code is associated with enhanced messaging. For instance, the content provider may have previously registered as an enhanced messaging content provider. Web content, associated with the content provider, may be retried by accessing a link, such as a uniform resource locator ("URL"), that is associated with the short code. Additionally, or alternatively, the text may include a URL to web content.

The web content may be, for example, a web page that includes text, images, videos, sound, and/or other content. As further shown, the user device (e.g., the enhanced messaging application) may concurrently display the received text and the retrieved web content. For instance, a user interface of the enhanced messaging application may include a web content pane and a text messaging pane. The web content pane may display web content, such as the web content retrieved via the URL. The text messaging pane may display the received text message (as well as other texts sent to and/or from the same short code).

As shown in FIG. 1B, the user may send a text message ("Other scores"), using the enhanced messaging application. The text message may be received by a message relay server, associated with a wireless telecommunications network. The message relay server may authenticate the user device, based on an identifier (and/or other authentication information) included in the text message. The message relay server may provide the content of the text message (e.g., the words "Other scores"), as well as an indication that the user device has been authenticated, to the content provider. The content provider may process the content of the message (e.g., may determine that the user is requesting scores from other games), and may provide updated web content to the user device. For instance, as shown, the content provider may provide other sports scores, and the enhanced messaging application may display the sports scores in the web content pane.

Figure 2:
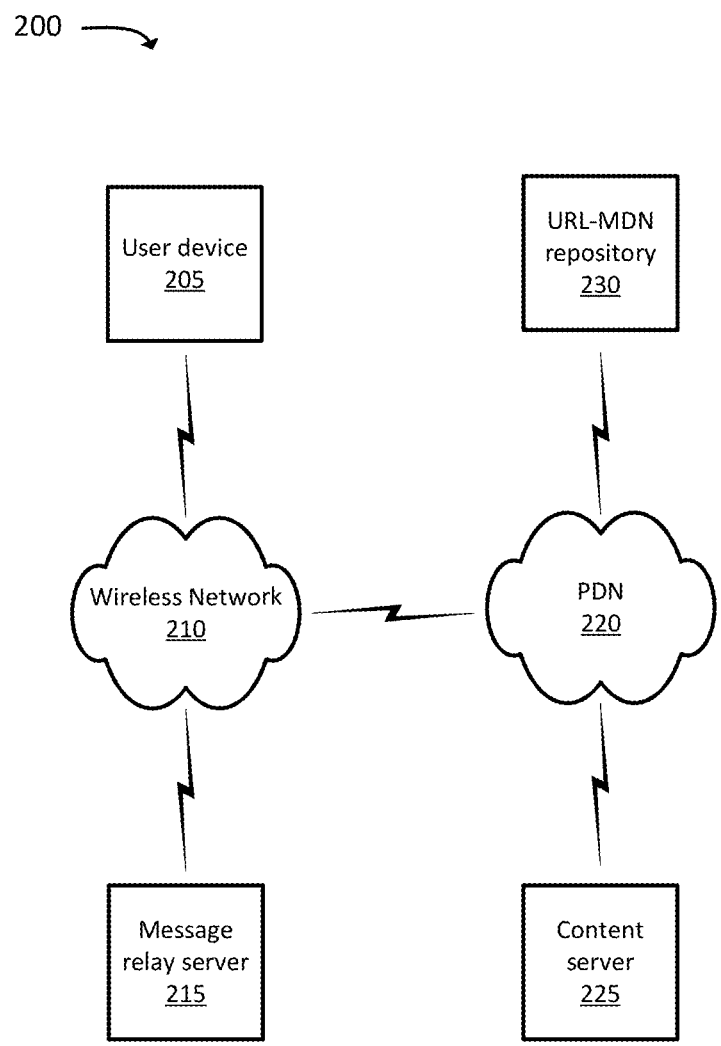
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include user device 205, wireless network 210, message relay server 215, packet data network ("PDN") 220, content server 225, and URL-MDN repository 230.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

User device 205 may include any computation and communication device that is capable of communicating with one or more networks (e.g., wireless network 210, PDN 220, etc.). For example, user device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 205 may communicate with other devices, such as one or more other user devices 205, message relay server 215, content server 225, URL-MDN repository 230, etc., via wireless network 210 and/or PDN 220.

Wireless network 210 may include one or more networks, via which one or more devices, shown in FIG. 2, may communicate. For example, wireless network 210 may include an evolved packet system ("EPS") that includes a Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 205 and/or another device may communicate with the EPC network. The EPC network may include one or more serving gateways ("SGWs"), mobility management entities ("MMEs"), and/or packet data network ("PDN") gateways ("PGWs"), and may enable user device 205 to communicate with PDN 220 and/or an IP Multimedia Subsystem ("IMS") core network. The IMS core network may manage authentication, session initiation, account information, a user profile, etc. associated with user device 205.

Wireless network 210 may include one or more wireless networks in addition to, or in lieu of, an LTE network. For example, wireless network 210 may include a Code Division Multiple Access ("CDMA") 2000 1X network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network.

Message relay server 215 may include one or more network devices that receive text messages (e.g., SMS messages, MMS messages, or other types of messages), and forward the text messages to an intended destination. For instance, message relay server 215 may communicate with components of wireless network 210, such as an SMS center ("SMSC"), an MMS center ("MMSC"), etc. In some implementations, message relay server 215 may communicate with components of wireless network 210 using a suitable technique, such as using the Short Message Peer-to-Peer ("SMPP") protocol and/or via an MM7 interface. The message relay server may forward text messages, sent by user device 205, toward content server 225, and vice versa. In some implementations, message relay server 215 and content server 225 may communicate via PDN 220 (e.g., via an Internet Protocol ("IP") connection and/or another type of protocol).

PDN 220 may include a packet-switched network, such as the Internet. Additionally, or alternatively, PDN 220 may include one or more other types of networks, such as a metropolitan area network ("MAN"), a wide area network ("WAN"), a private enterprise network, etc.

Content server 225 may include one or more server devices that may provide content, such as web content and/or text message content, to user device 205. Content server 225 may additionally, or alternatively, receive input from user device 205 (e.g., as received via text message and/or another type of message), and may process the input in order to provide a response to user device 205 (e.g., by way of web content, text message content, or in some other manner). Content server 225 may, for instance, provide web content to user device 205 via an IP-based connection, and may send and/or receive text messages to and/or from user device 205 via message relay server 215.

URL-MDN repository 230 may include one or more server devices that store information associating mobile directory numbers ("MDNs") to URLs. For example, URL-MDN repository 230 may store MDNs, telephone numbers, short codes, and/or other identifiers, associated with one or more content providers (e.g., with one or more content servers 225). A particular URL, for a particular content provider, may correspond to a web address of content server 225, associated with the content provider. While the term "URL" is used herein, in some implementations, other location identifiers, or links, may be used to indicate the logical location of a web-based resource. For example, IP addresses, uniform resource identifiers ("URIs"), logical names, and/or other types of location identifiers may be used. The MDN (or short code) may correspond to a telephone number from which the content provider sends text messages. URL-MDN repository 230 may, for example, receive information linking a URL to an MDN as part of a registration process of content server 225 (e.g., from a content provider associated with content server 225 and/or an administrator associated with wireless network 210 or URL-MDN repository 230).

Figures 3, 4:
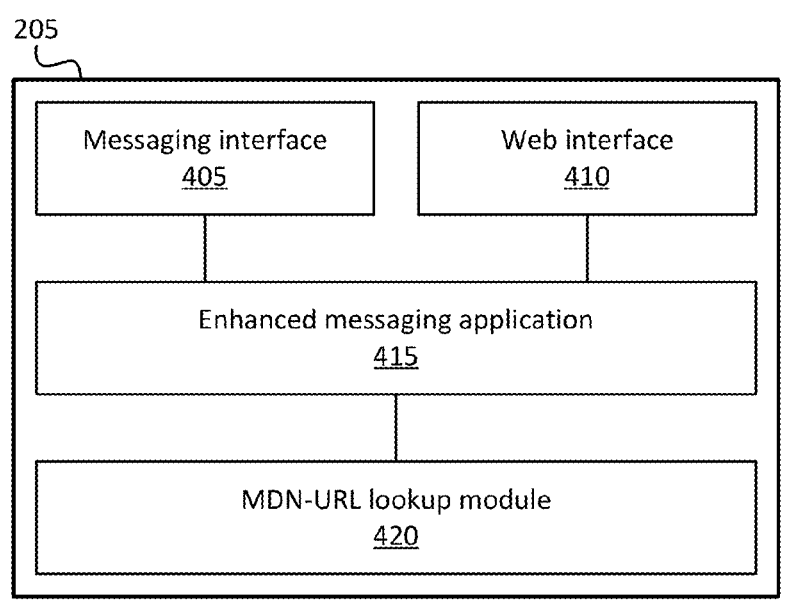
FIG. 3 illustrates an example data structure that may be stored by a uniform resource locator-mobile directory number ("URL-MDN") repository.
FIG. 4 illustrates example functional components of a user device, in accordance with some implementations.

FIG. 3 illustrates an example data structure 300, which may be stored by URL-MDN repository 230. Data structure 300 may include a telephone number (e.g., an MDN, a short code, and/or another type of identifier). For instance, as shown, example short code "1234" may be associated with the URL "www.foo.com," the short code "5678" may be associated with the URL "bar.com," and so on.

FIG. 4 illustrates example functional components of user device 205, in accordance with some implementations. For instance, as shown, user device 205 may include messaging interface 405, web interface 410, enhanced messaging application 415, and MDN-URL lookup module 420. These components may be implemented via hardware circuitry, software logic, and/or a combination of hardware and/or software associated with user device 205. In some implementations, user device 205 may include additional, fewer, different, and/or differently arranged components. Furthermore, some, or all, of the functionality of one or more components may be performed by one or more other components.

Messaging interface 405 may send and/or receive text messages, such as SMS messages or MMS messages. In some implementations, messaging interface 405 may send other types of messages, such as messages that include identifying and/or authentication information, based on which the identity of user device 205 can be verified. Messaging interface 405 may, in some implementations, send and/or receive SMS messages (e.g., to and/or from message relay server 215) via the SMPP protocol, and may send and/or receive MMS messages over an MM1 interface.

Web interface 410 may send and/or receive web content (e.g., via an IP interface, an implementation of an application programming interface ("API"), and/or some other type of interface) to and/or from content server 225. For example, web interface 410 may receive web pages, video content, audio content, image content, data files, and/or other types of content, from content server 225 and/or from another source. Web interface 410 may also output information to content server 225, such as information related to user interactions with web content (e.g., selections of links on web pages, etc.).

Enhanced messaging application 415 may present a user interface (e.g., a graphical user interface ("GUI")), that presents text message content (e.g., as received via messaging interface 405) and web content (e.g., as received via web interface 410). For instance, enhanced messaging application 415 may present the text message content in one pane, while presenting the web content in another pane. Example arrangements of the text messaging pane and the web content pane are described below with respect to, for example, FIGS. 14A-14F. The web content pane may include web browser functionality (e.g., the capability to receive web pages and/or other web-based content, and provide for user interactions, such as selections of links, input of URLs to retrieve, etc.).

MDN-URL lookup module 420 may identify whether web content is associated with a received text message, and may obtain a URL for the web content if the text message is associated with web content. For example, MDN-URL lookup module 420 may identify a telephone number (e.g., an MDN, a short code, etc.) of a sender of text messages, received by user device 205. MDN-URL lookup module 420 may communicate with URL-MDN repository 230, in order to determine whether the telephone number is associated with a URL. Additionally, or alternatively, MDN-URL lookup module 420 may store URLs that are associated with telephone numbers (e.g., may store a data structure similar to data structure 300, described above). For instance, MDN-URL lookup module 420 may cache information received from URL-MDN repository 230, and may check the cached information prior to contacting URL-MDN repository 230. Web interface 410 and enhanced messaging application 415 may use the URL, determined by MDN-URL lookup module 420, in order to retrieve web content associated with a text message.

For instance, the first time a text message is received from a particular sender, MDN-URL lookup module 420 may determine a URL associated with the sender. In some implementations, MDN-URL lookup module 420 may contact URL-MDN repository 230, even if MDN-URL lookup module 420 has previously received URL information for a particular telephone number. For instance, if the cached information is stale (e.g., has been received at least a threshold amount of time prior to a present text message), MDN-URL lookup module 420 may contact URL-MDN repository 230. Contacting URL-MDN repository 230 again may be useful in situations where the sender of the text message has provided a new URL. In some implementations, the text message (received via messaging interface 405) may include a URL. In some such implementations, MDN-URL lookup module 420 may determine that the included URL should be used, notwithstanding information that may have been stored by MDN-URL lookup module 420 or that may be received from URL-MDN repository 230.

Figure 5:
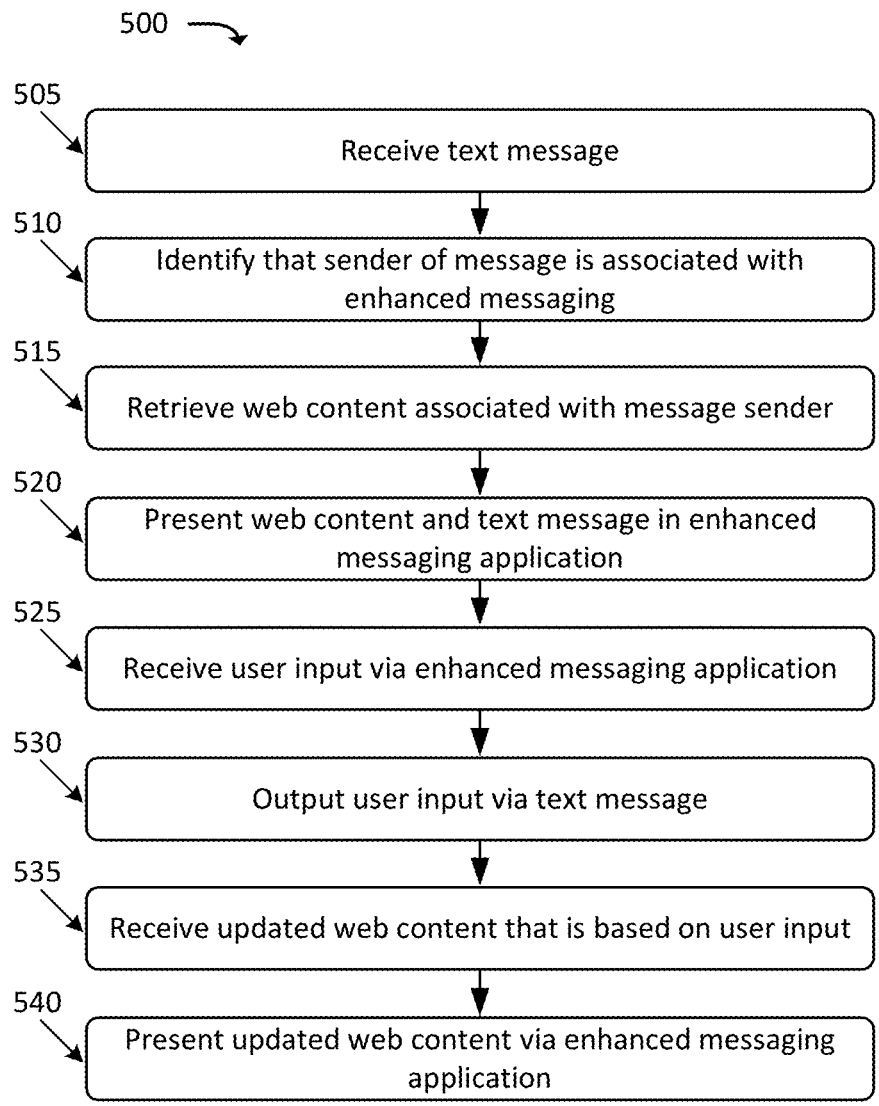
FIG. 5 illustrates an example process for presenting dynamic web content based on a received text message.

FIG. 5 illustrates an example process 500 for presenting text messaging content and web content in an enhanced messaging application. In some implementations, some or all of process 500 may be performed by user device 205 (e.g., by one or more components described above with respect to FIG. 4). In other implementations, some or all of process may be additionally, or alternatively, performed by one or more other devices.

As shown, process 500 may include receiving (at 505) a text message. For example, as described above with respect to messaging interface 405, user device 205 may receive a text message (e.g., an SMS message, an MMS message, etc.) from content server 225.

Process 500 may also include identifying (at 510) that a sender of the text message is associated with enhanced messaging. For example, as described above with respect to MDN-URL lookup module 420, user device 205 may determine whether a telephone number of the sender of the text message is associated with a URL (e.g., by checking a local cache and/or by contacting URL-MDN repository 230).

Process 500 may further include retrieving (at 515) web content associated with the message sender. For example, as described above with respect to web interface 410, user device 205 may retrieve web content, from content server 225, that corresponds to the URL (identified at 510).

Process 500 may additionally include presenting (at 520) web content and the text message in an enhanced messaging application. For example, as described above with respect to enhanced messaging application 415, user device 205 may present the web content and the text message in an enhanced messaging interface.

Process 500 may also include receiving (at 525) user input via the enhanced messaging application. For example, user device 205 may receive a text message (via enhanced messaging application 415), inputted by a user of user device 205. The text message may correspond to options, provided by content server 225. Some example options and interactions are described below with respect to FIGS. 8A-8E and 10-13. In some implementations, the user input may correspond to an interaction with the web content (e.g., clicking a link on a web page).

Process 500 may further include outputting (at 530) the user input via text message. For example, as described above with respect to messaging interface 405, user device 205 may send a text message to content server 225 (e.g., via message relay server 215), that includes information regarding the user input (received at 525). For instance, if the user input includes text, provided via a text messaging pane of enhanced messaging application 415, the text message (outputted at 530) may include the text inputted by the user. In some implementations, if the user input includes an interaction with the web content, the text message (outputted at 530) may include information indicating the interaction. For example, assume that the user selects a link, on the web content, to a particular URL. In some implementations, enhanced messaging application 415 may forgo outputting a request (e.g., a hypertext transport protocol ("HTTP") GET request, via web interface 410) for web content at the URL, and may instead send a text message (via messaging interface 405) to content server 225. Based on the user input (received at 530), content server 225 may output updated web content.

Process 500 may additionally include receiving (at 535) updated web content that is based on the user input. For example, as described above with respect to web interface 410, user device 205 may receive updated web content, outputted by content server 225 in response to the user input (provided at 530). Process 500 may also include presenting (at 540) the updated web content via the enhanced messaging application.

Figure 6:
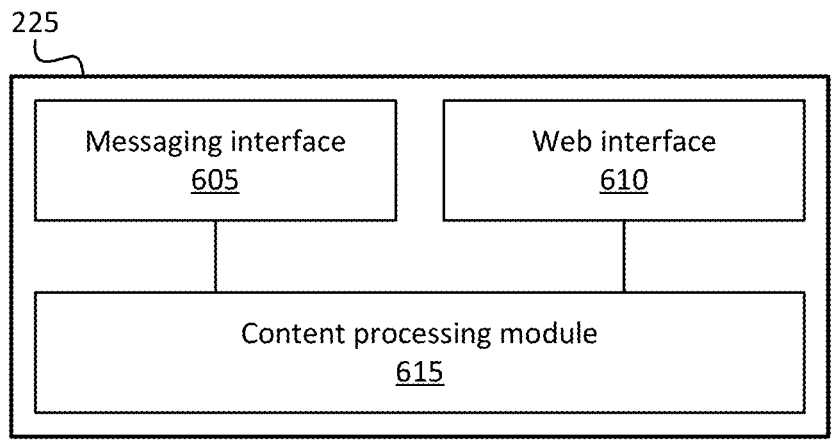
FIG. 6 illustrates example functional components of a content server, in accordance with some implementations.

FIG. 6 illustrates example functional components of content server 225, in accordance with some implementations. For example, content server 225 may include messaging interface 605, web interface 610, and content processing module 615. These components may be implemented via hardware circuitry, software logic, and/or a combination of hardware and/or software associated with content server 225. In some implementations, content server 225 may include additional, fewer, different, and/or differently arranged components. Furthermore, some, or all, of the functionality of one or more components may be performed by one or more other components.

Messaging interface 605 may send and/or receive text messages (e.g., to and/or from user device 205). Text messages, received from user device 205, may be received via message relay server 215. Messaging interface 605 may, in some implementations, communicate with message relay server 215 using the SMPP protocol and/or via an MM7 interface. Text messages, received from user device 205 (e.g., via message relay server 215) may be considered authenticated, or "trusted," inasmuch as the identity of user device 205 may be verified by message relay server 215 before being forwarded to messaging interface 605. Thus, it may not be necessary to request additional authentication information, from user device 205, when a text message has been received from user device 205 (e.g., a text message requesting personal or sensitive information).

Web interface 610 may send and/or receive web content (e.g., to and/or from user device 205). For example, web interface 610 may include an IP interface, an implementation of an API, and/or some other type of interface.

Content processing module 615 may determine the content that should be sent to user device 205. For instance, content processing module 615 may receive information, regarding user interactions, from messaging interface 605 and/or web interface 610. As mentioned above, text messages, received via messaging interface 605, may include information identifying user device 205, and the identifying information may be considered "trusted." Content processing module 615 may also maintain a context of user interactions. For example, content processing module 615 may initially determine that a generic web page should be sent to user device 205 (e.g., based on an initial request, from user device 205, for web content). Content processing module 615 may subsequently receive a text message from user device 205 (e.g., a request for information), verify the identity of user device 205, and provide web content in response to the text message (e.g., the requested information) via web interface 610. Additionally, or alternatively, content processing module 615 may provide a text message (via messaging interface 605) in response.

Figure 7:
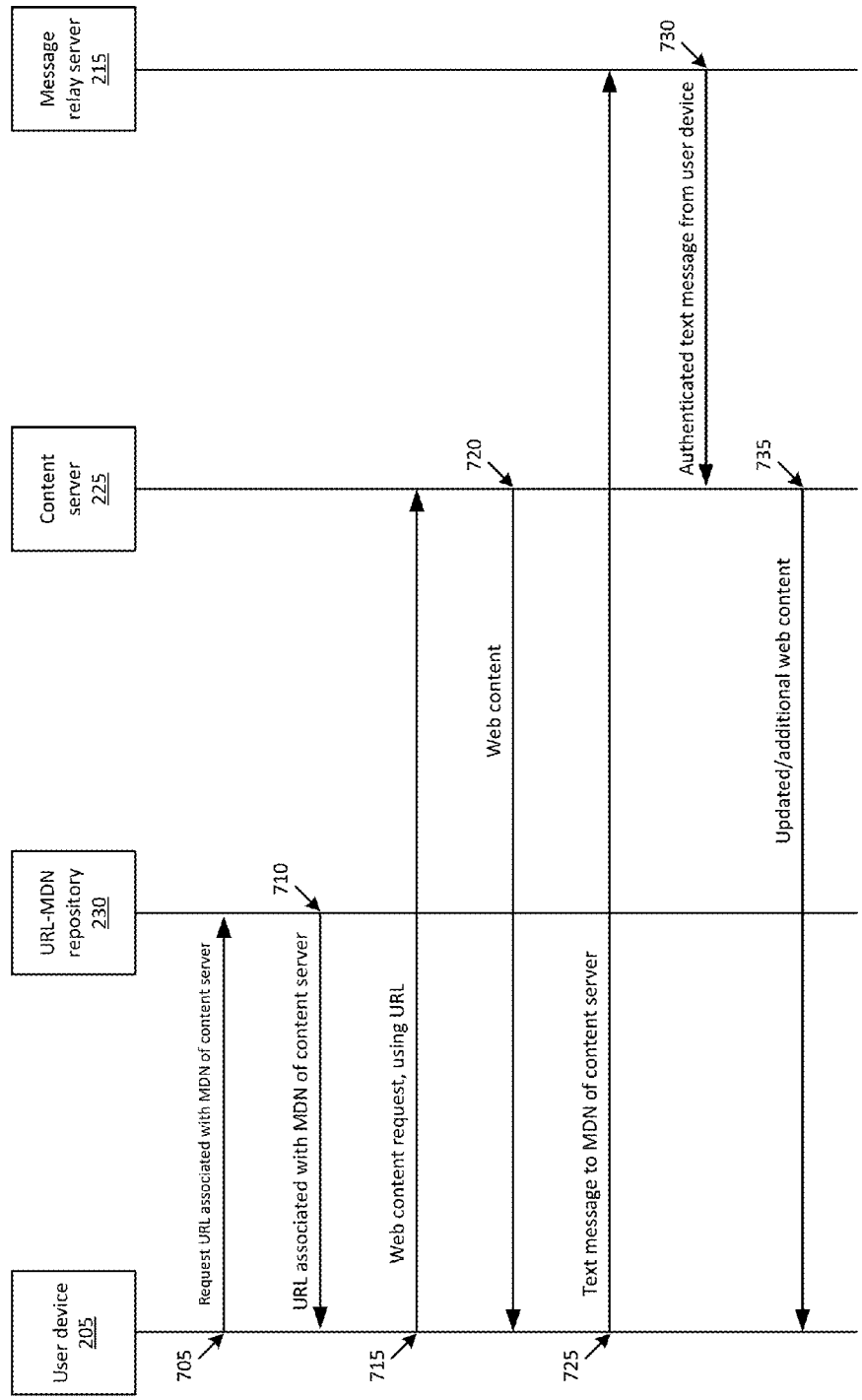
FIG. 7 illustrates an example signal flow that corresponds to presenting dynamic web content based on a received text message.

FIG. 7 illustrates an example signal flow that corresponds to providing dynamic web content to user device 205 in an enhanced messaging interface. Assume that user device 205 receives a text message from content server 225. Additionally, or alternatively, assume that a user of user device 205 has sent a text message to content server 225.

As shown, user device 205 may (at 705) output a request to URL-MDN repository 230 for a URL associated with the telephone number of content server 225. Additionally, or alternatively, as described above, user device 205 may check a local cache to determine the URL. URL-MDN repository 230 may provide (at 710) the URL associated with the telephone number of content server 225.

User device 205 may use the URL to request (at 715) web content from content server 225. Content server 225 may process the request, and provide (at 720) web content that corresponds to the URL. User device 205 may, in some implementations, present the web content and the text message in an enhanced messaging interface.

User device 205 may output (at 725) a text message to content server 225 (e.g., via message relay server 215). Message relay server 215 may authenticate the text message, and may forward (at 730) the text message (as well as the identity of user device 205 and/or an indication that the identity of user device 205 has been verified). Content server 225 may, based on the received text message, provide (at 735) updated or additional web content to user device 205.

Figure 8A:
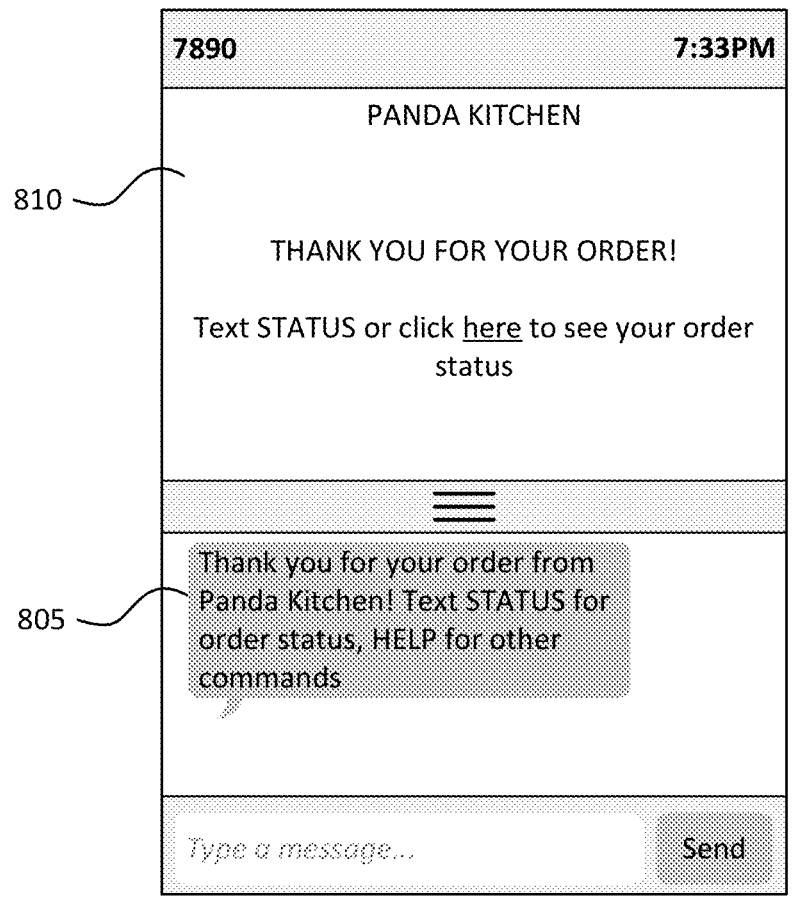
FIGS. 8A-8E conceptually illustrate examples of presenting dynamic web content based on a received text message.

FIGS. 8A-8D illustrate user interfaces, in which dynamic web content may be presented based on text messages from a user. For example, as shown in FIG. 8A, text message 805 (received by user device 205) may be displayed in a messaging pane of an enhanced messaging interface. Text message 805 may be received in response to a user, of user device 205, ordering food from a restaurant. As described above, a URL may be identified, based on a telephone number of the sender of the text message ("7890," in this example), and web content 810 may be retrieved and displayed in a web content pane of the enhanced messaging interface.

Figure 8B:
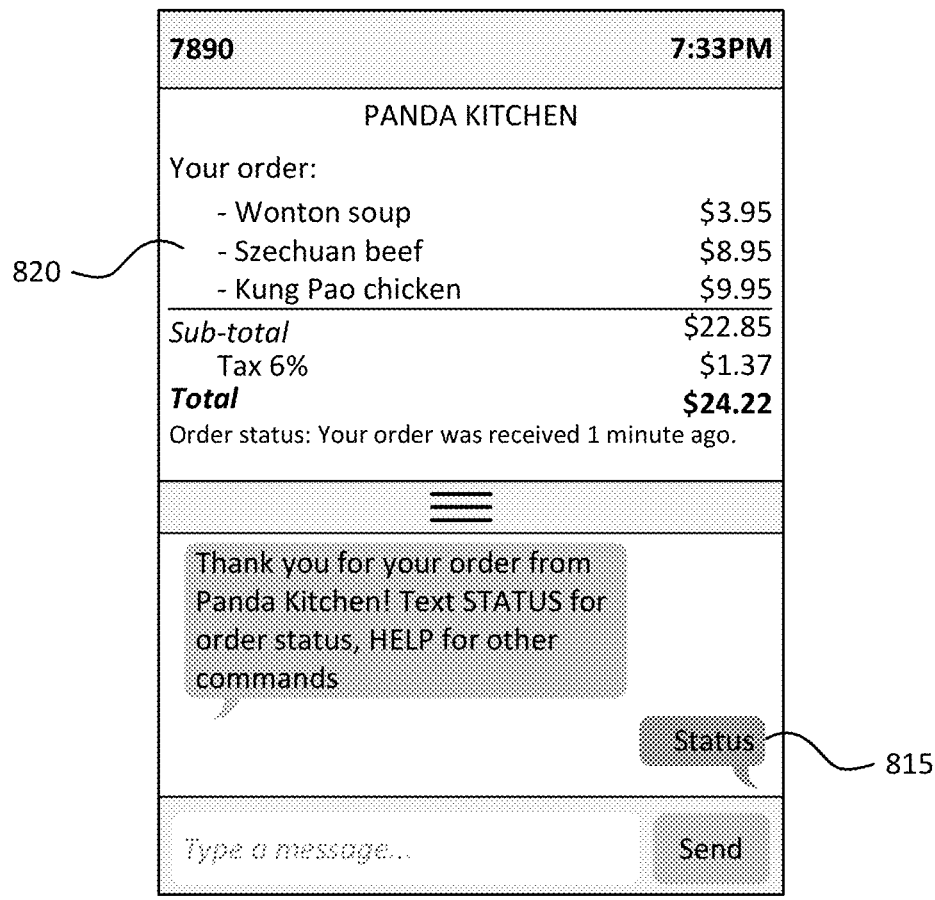

As shown in FIG. 8B, text message 815 may be sent by user device 205, requesting the status of the food order. Updated web content 820 may be received and displayed in the enhanced messaging interface, showing the requested status. Identifying information, associated with text message 815 (e.g., as verified by message relay server 215), may be used to identify the food order.

Figure 8C:
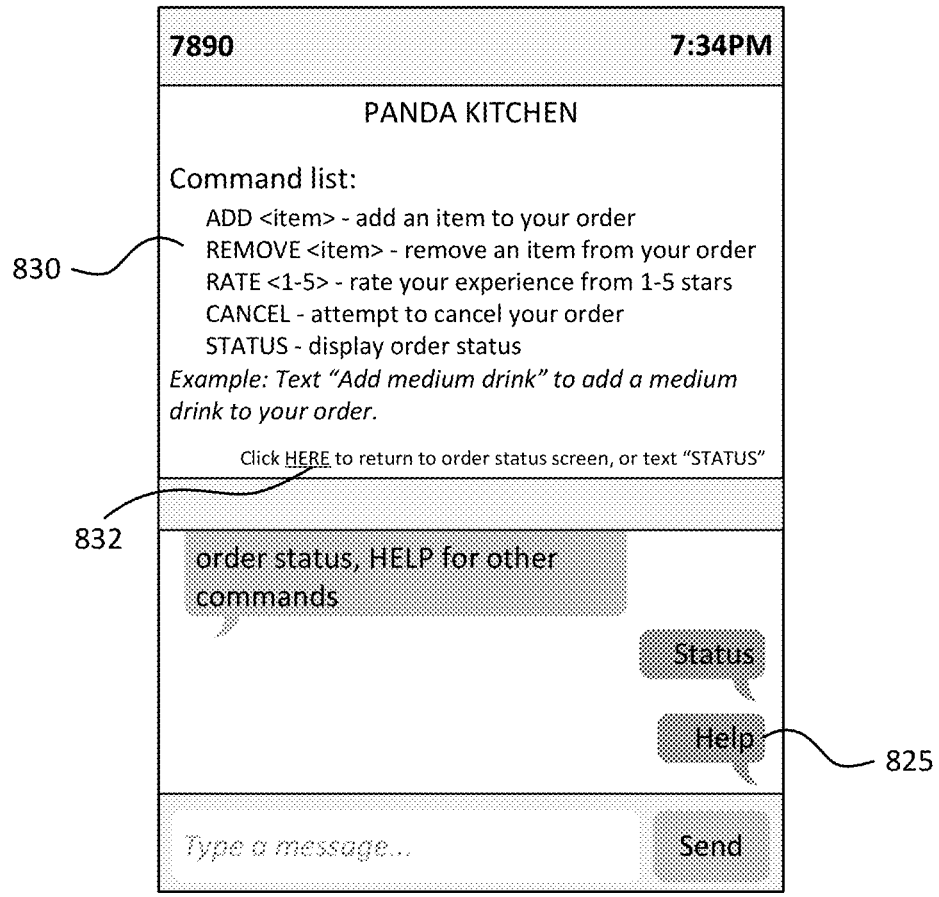

As shown in FIG. 8C, text message 825 may be sent by user device 205, requesting a list of commands. Updated web content 830 may be received and displayed in the enhanced messaging interface, showing the requested command list. Updated web content 830 may include link 832. As mentioned above, in some implementations, the enhanced messaging application may output a text message (e.g., a text message with the word "STATUS") when a user selects the link, in lieu of outputting an HTTP request based on the selection of the link.

Figure 8D:
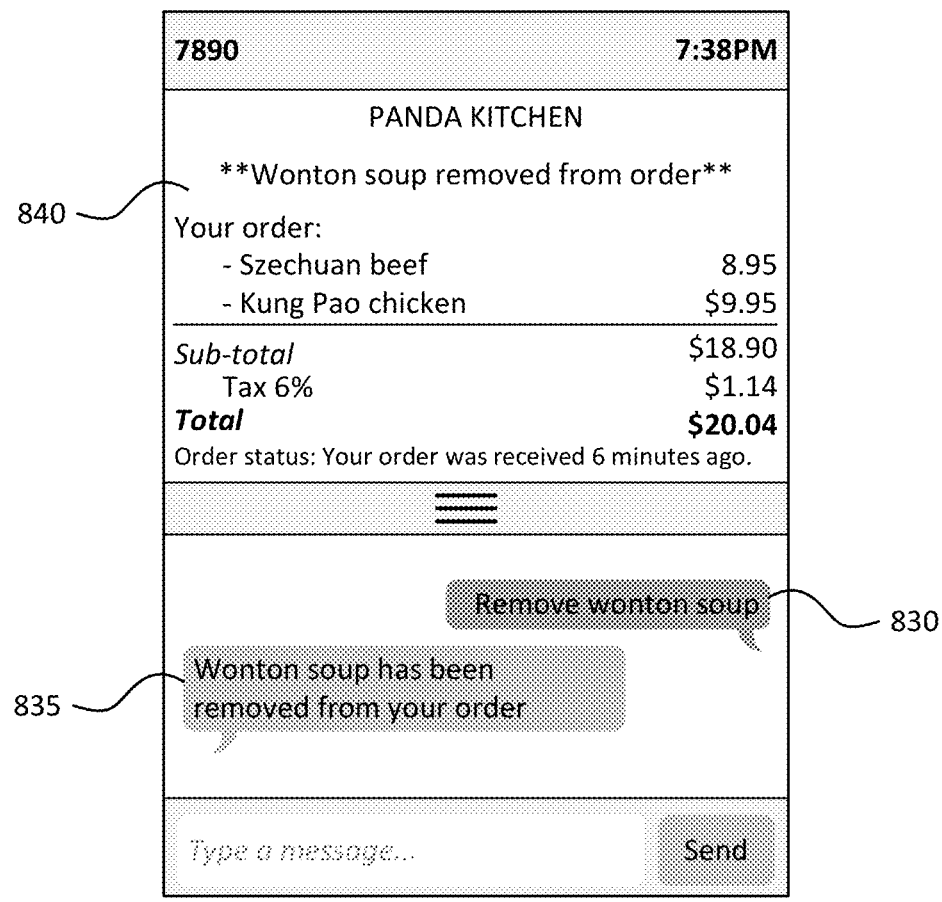

As shown in FIG. 8D, text message 830 may be sent by user device 205, removing an item from the food order. The text message may be processed and, upon successful removal of the item, text message 835 may be sent to user device 205, and displayed in the text messaging pane. Further, updated web content 840, reflecting the removed food item, may be shown in the web content pane.

Figure 8E:
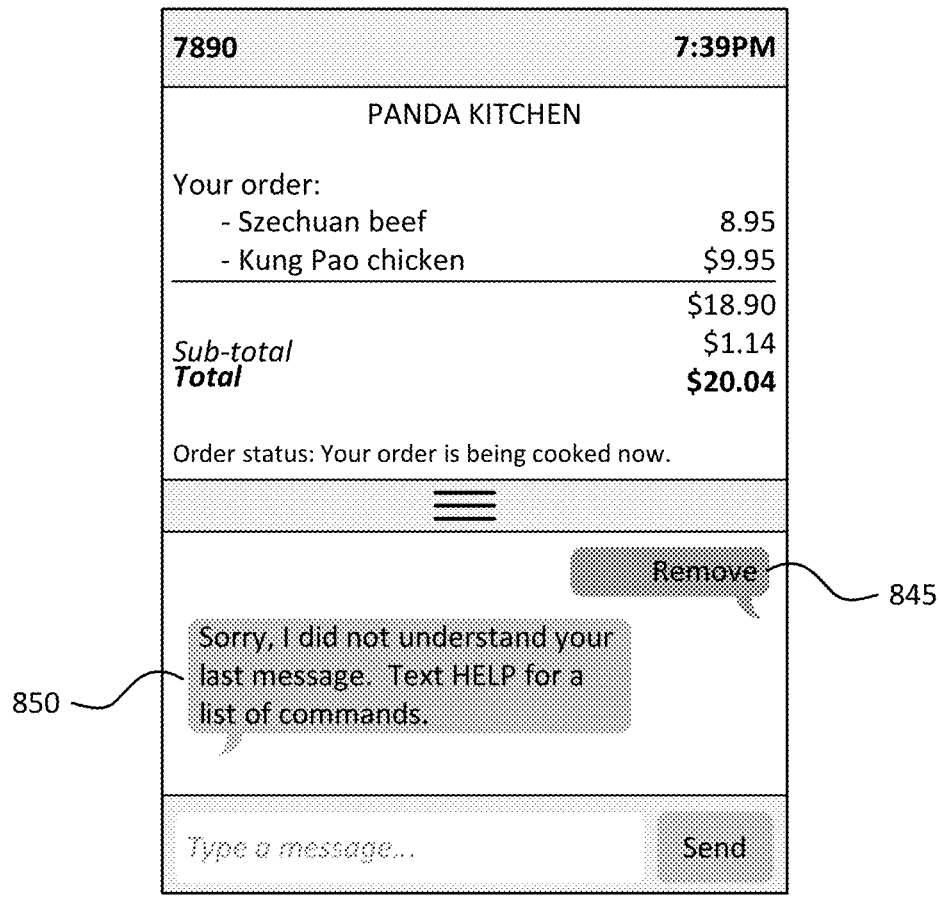

As shown in FIG. 8E, text message 845 may be sent by user device 205. Text message 845 may not be recognized by content server 225 (e.g., may be an invalid command), and text message 850 may be sent to user device 205 and displayed in the text messaging pane, indicating that the last message was not understood.

Figure 9:
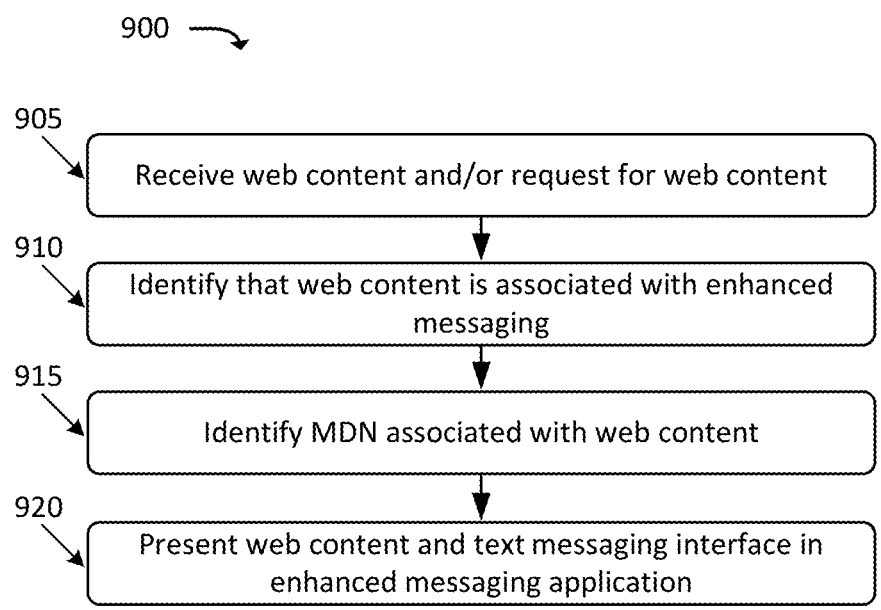
FIG. 9 illustrates an example process for presenting an enhanced messaging interface based on identifying web content that is associated with enhanced messaging.

While examples above have been described in the context of identifying a URL based on a received text message, in some implementations, user device 205 may determine that a URL is associated with an enhanced messaging interface. Process 900, shown in FIG. 9, illustrates an example of presenting web content and text messaging content based on identifying that a URL is associated with an enhanced messaging interface.

As shown, process 900 may include receiving (at 905) web content and/or a request for web content. For example, user device 205 may receive web content via a web browser, an enhanced messaging application, and/or via some other process. As another example, user device 205 may receive a request for web content (e.g., a user may type a URL, a user may select a hyperlink, a URL may be received via text message, etc.).

Process 900 may further include identifying (at 910) that the web content is associated with enhanced messaging, and identifying (at 915) a telephone number associated with the web content. For example, user device 205 may contact URL-MDN repository 230 and/or a local cache (e.g., a data structure similar to data structure 300), in order to identify that a URL of the web content is associated with a telephone number (and is, therefore, associated with enhanced messaging). Process 900 may also include presenting (at 920) the web content and a text messaging interface in an enhanced messaging application (e.g., in a manner similar to that described herein).

Figure 10:
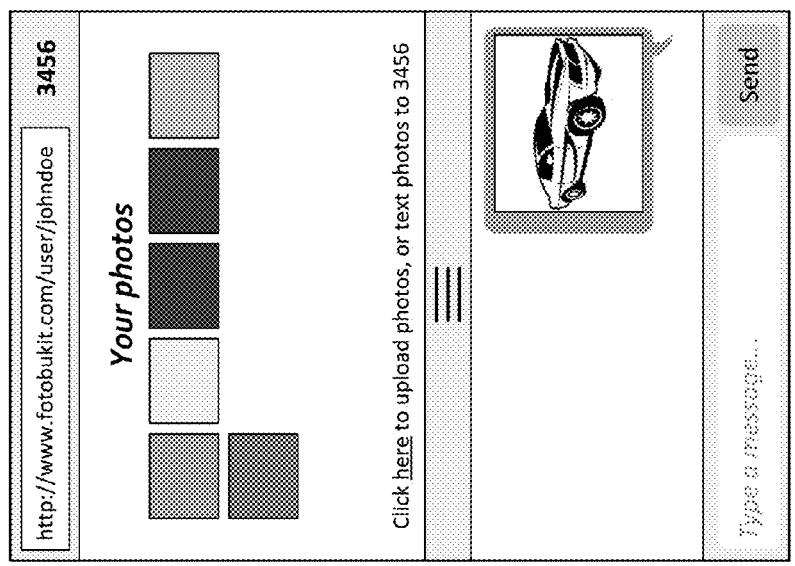
FIG. 10 conceptually illustrates an example of presenting an enhanced messaging interface based on identifying web content that is associated with enhanced messaging.
Figure 10:
Figure 10:
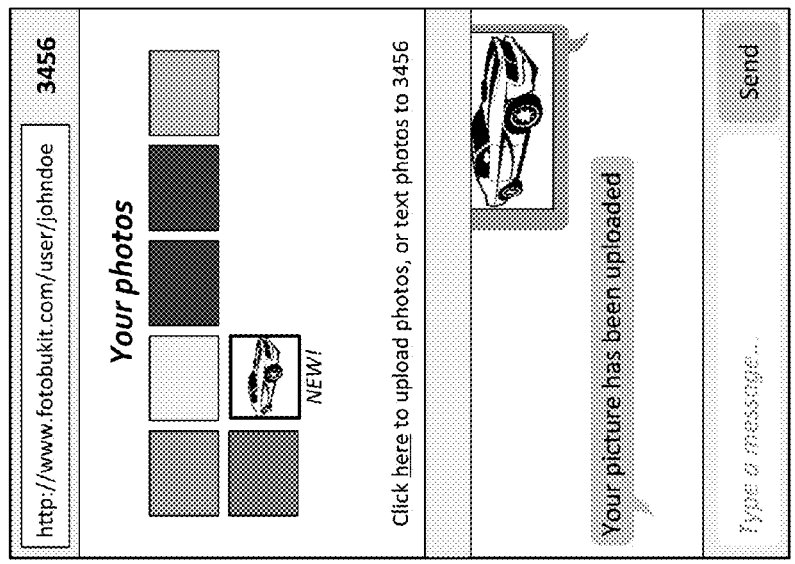

FIG. 10 conceptually illustrates an example of presenting an enhanced messaging application based on identifying corresponding web content. For instance, as shown, assume that a user has navigated to the URL "http://www.fotobukit.com/user/johndoe" (by clicking a hyperlink, by manually entering the URL, etc.) in a web browser and/or in a web content pane of an enhanced messaging interface. User device 205 may compare the URL (or part of the URL, such as the domain name only) to information stored in data structure 300, in order to identify a telephone number (the short code "3456," in this example) associated with the URL. In situations where the URL is entered into a web browser (or some other application that is different from the enhanced messaging application), wireless network 210 may open the enhanced messaging application (e.g., automatically, or after prompting the user) to display the web content and the text message content.

As also shown in FIG. 10, the enhanced messaging application, of some implementations, may be used to upload pictures. For example, the web content, shown in FIG. 10, may correspond to thumbnails of pictures associated with an account of a user. As shown, a picture may be sent (e.g., via MMS), through the enhanced messaging application. Upon receiving the picture, content server 225, associated with the web content, may update the web content to reflect that the picture has been successfully uploaded (e.g., may show thumbnail of the picture in the web content, may display text ("NEW!") showing that the picture has been uploaded, etc.). Additionally, or alternatively, a text message may be sent to user device 205, indicating that the picture has been uploaded.

Figure 11:
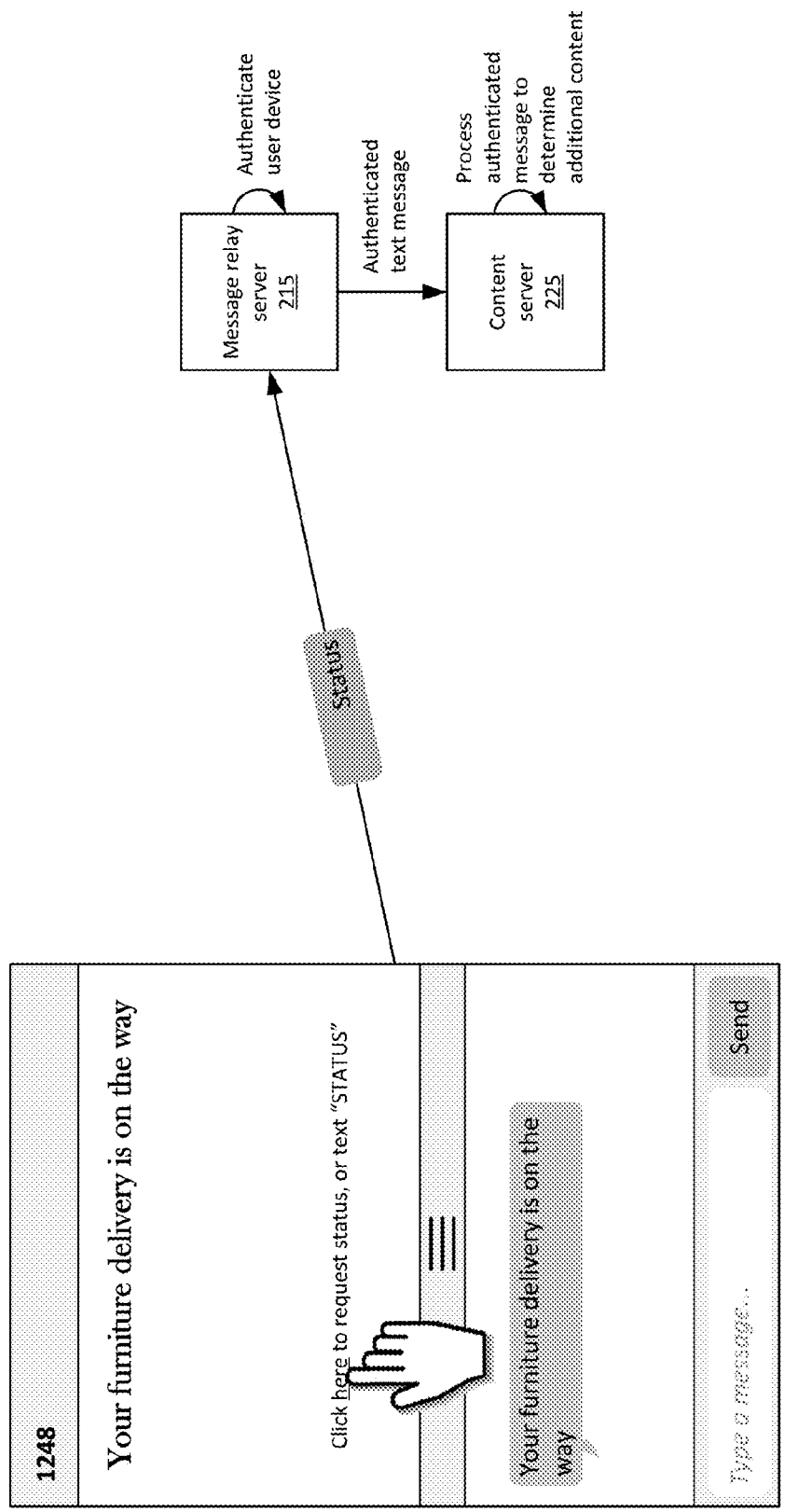
FIG. 11 conceptually illustrates an example of outputting user interactions, on web content, via text message.

FIG. 11 conceptually illustrates the handling of user interactions, with web content, via text message. For example, web content, displayed in an enhanced messaging interface, may include a hyperlink. In some implementations, code, within the page (e.g., extensible markup language ("XML") code, HTML comments, code according to an API, and/or other code) may indicate that the hyperlink should be used to send a text message, with the word "Status," to a particular telephone number (the short code "1248," in this example). As shown, content server 225 may receive the text message, and may process the text message to provide additional/updated web content (e.g., may update the web content to provide detailed status information).

Figure 12:
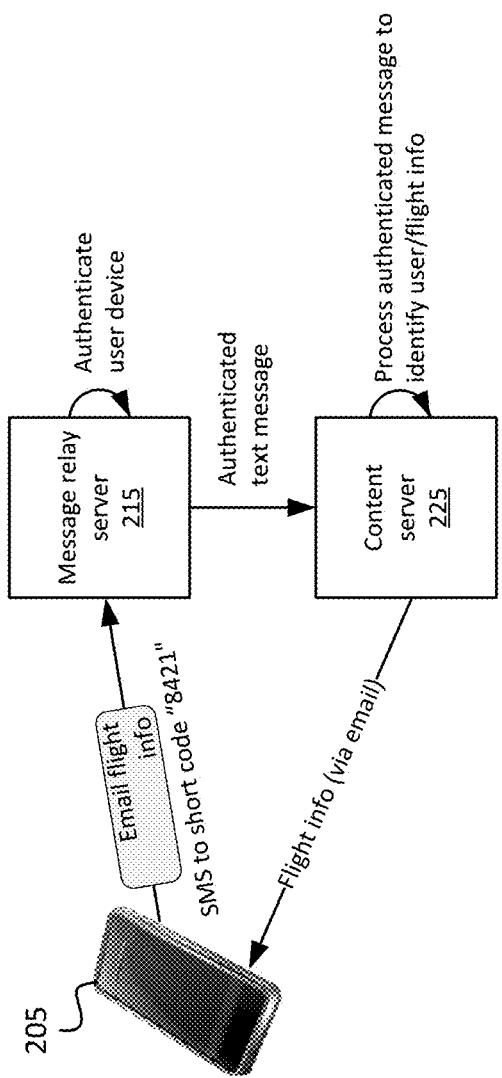
FIGS. 12 and 13 conceptually illustrate additional examples of providing dynamic content based on a text message from a user device.

FIG. 12 conceptually illustrates an example implementation, in which a text message, from user device 205, may be used to trigger the providing of dynamic content, other than a web page or text message. For example, user device 205 may send the text, "Email flight info" to a short code associated with an airline ("8421," in this example). As described above, message relay server 215 may authenticate and/or identify user device 205, and may provide the authenticated text message to content server 225. Content server 225 may, based on the identity of user device 205 and the content of the text message, determine that a user of user device 205 is requesting that flight information for the user's next flight be provided to user device 205. Content server 225 may look up an email address associated with an MDN of user device 205, and may send an email to the email address, with the flight information.

Figure 13:
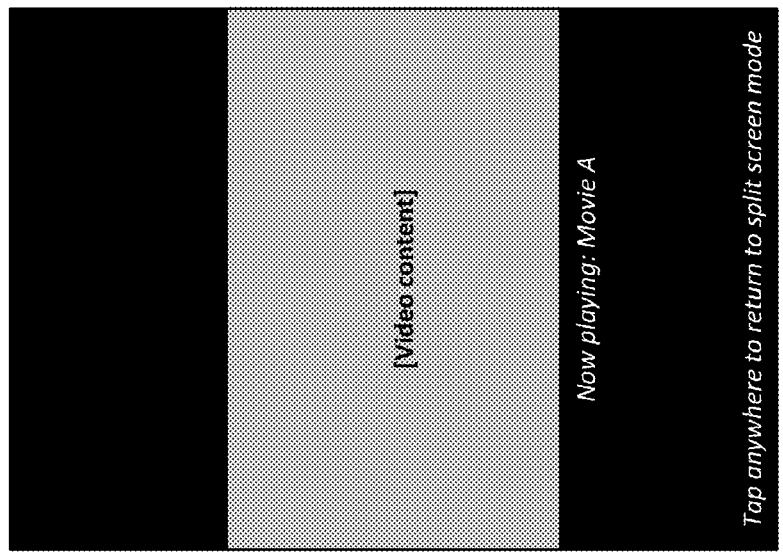
Figure 13:
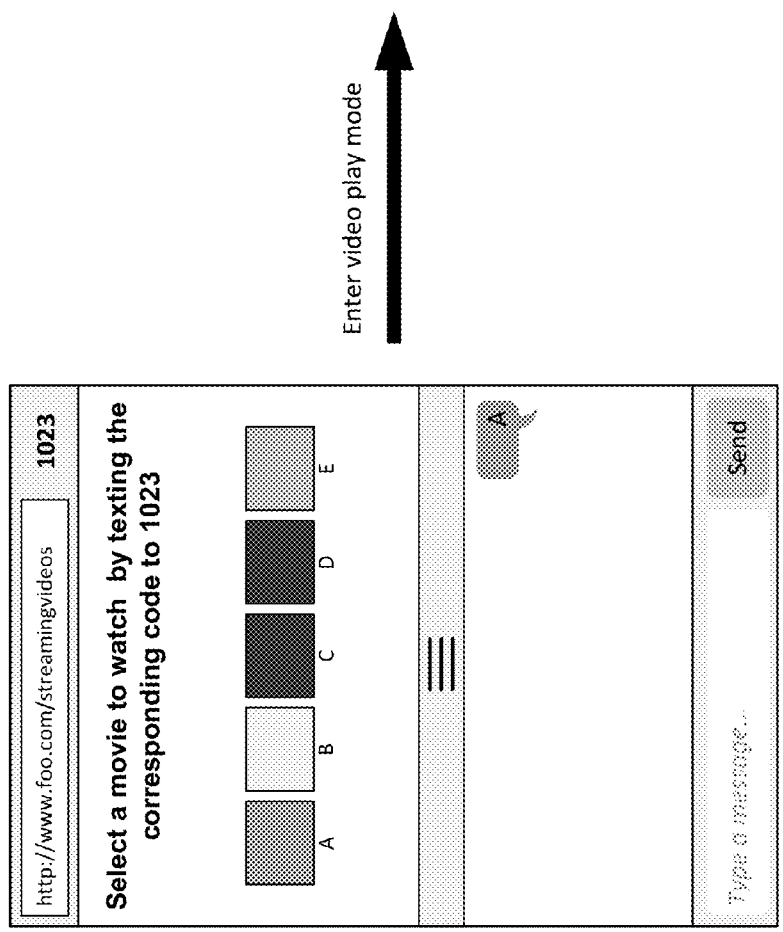

FIG. 13 conceptually illustrates another example of providing dynamic web content, based on text message interactions. For instance, as shown, a web content pane may display options for movies (e.g., streaming video content, pay-per-view video content, etc.). The web content pane may also display instructions on how to request that a particular movie be provided. In this example, five movie options are shown, each respectively associated with a letter between "A" and "E." As shown, the user may select movie "A," and may indicate his or her preference by sending a text with the letter "A." Once the selection is received and processed by content server 225, content server 225 may send an instruction to the enhanced messaging application, and/or may begin outputting the streaming content. Based on receiving the instruction, or based on automatically identifying that streaming video content is being send by content server 225, the enhanced messaging application may enter a video play mode.

In the video play mode, the web content pane and the text messaging pane may be replaced by a video play pane, in which the video is displayed (e.g., with black "letterbox" bars, in situations where the aspect ratio of the video is different from the aspect ratio of the display screen of user device 205). Although not shown in FIG. 13, the video play mode may include video controls, such as Play, Pause, Forward, Rewind, etc. In some implementations, the video play mode may include an option to return to split screen mode (in which, for example, the web content pane and the text messaging pane are displayed). For example, as shown, tapping the display screen may cause video play mode to be exited.

FIGS. 14A-14F illustrate example arrangements of the enhanced messaging interface, according to some implementations. The arrangements shown in these figures are non-limiting examples and, in practice, different arrangements may be used, and are within the contemplation of examples shown here.

Figure 14A:
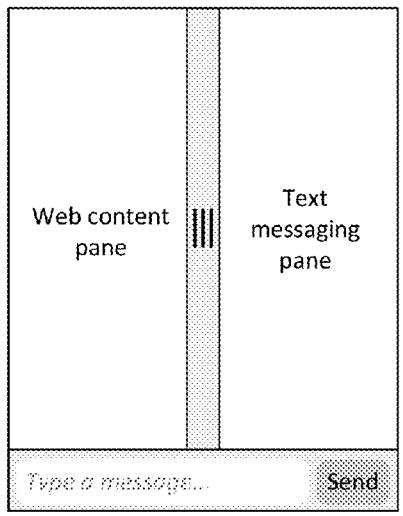
FIGS. 14A-14F illustrate example user interfaces, in accordance with some implementations described herein.

For instance, FIG. 14A illustrates an example arrangement, in which the web content pane and the text messaging pane are separated by a vertical separator. In this arrangement, an area for inputting a text message may be present below (or within) the web content pane and the text messaging pane.

Figure 14B:
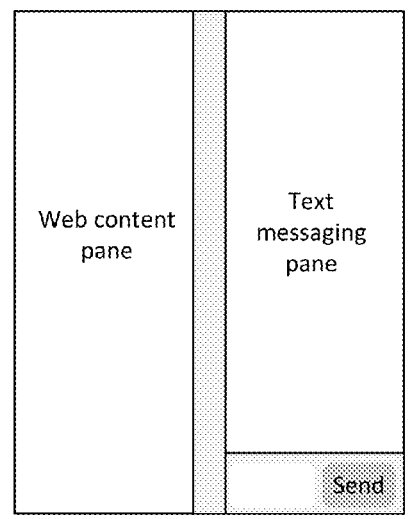

FIG. 14B illustrates an example arrangement, in which the web content pane and the text messaging pane are separated by a vertical separator. In this arrangement, an area for inputting a text message may be not present below (or within) the web content pane, and only present below (or within) the text messaging pane.

Figure 14C:
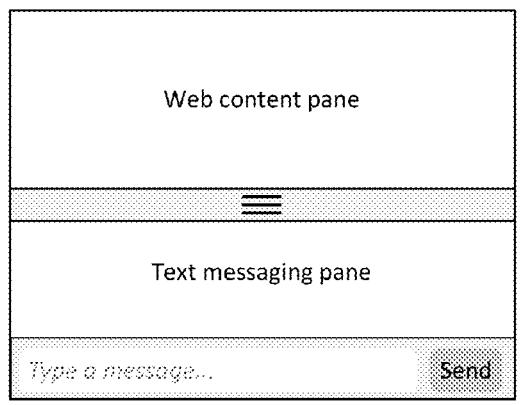
Figure 14D:
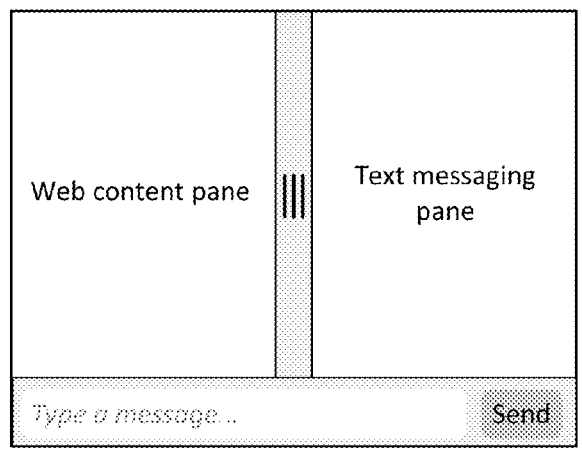

FIGS. 14C and 14D illustrate example arrangements, in which the web content pane and text messaging pane may be presented in "landscape" mode. In FIG. 14C, the panes may be separated by a horizontal separator, while in FIG. 14D, the panes may be separated by a vertical separator.

Figure 14E:
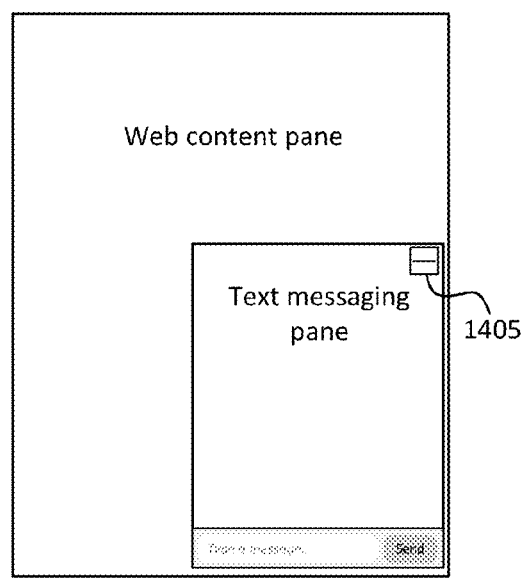

FIG. 14E illustrates an example arrangement, in which one pane may be overlaid on top of another pane. For example, as shown, the web content pane may occupy most of the display screen, and the text messaging pane may be overlaid on the web content pane. In some implementations, the text messaging pane may be able to be minimized (e.g., via minimize button 1405). In alternate implementations, the arrangement may be reversed. That is, in some implementations, the text messaging pane may occupy most of the display screen, and the web content pane may be overlaid on the text messaging pane.

Figure 14F:
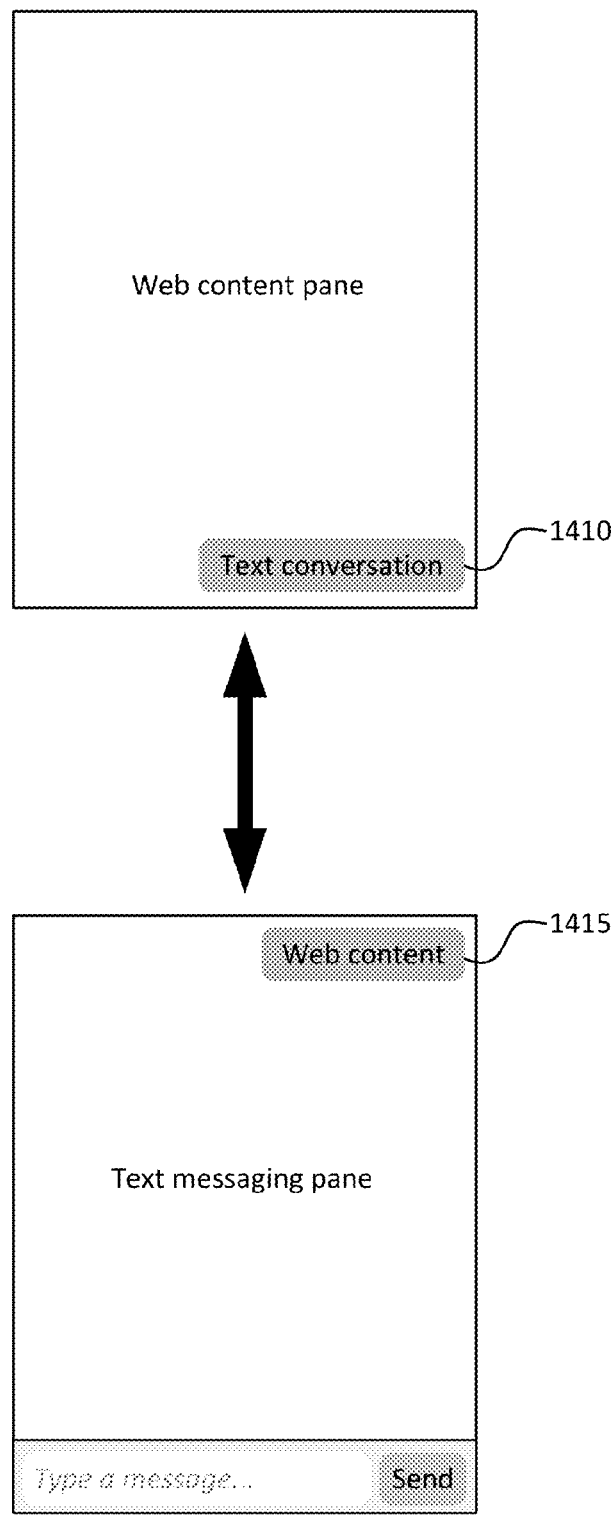

FIG. 14F illustrates an arrangement, in which the panes may each occupy the entire display screen at a particular time. For example, when the web content pane is displayed, the text messaging pane may be hidden (or minimized), and when the text messaging pane is displayed, the web content pane may be hidden (or minimized). Button 1410 may be used to switch to the text messaging pane, when the web content pane is displayed, and button 1415 may be used to switch to the web content pane, when the text messaging pane is displayed.

Figure 15:
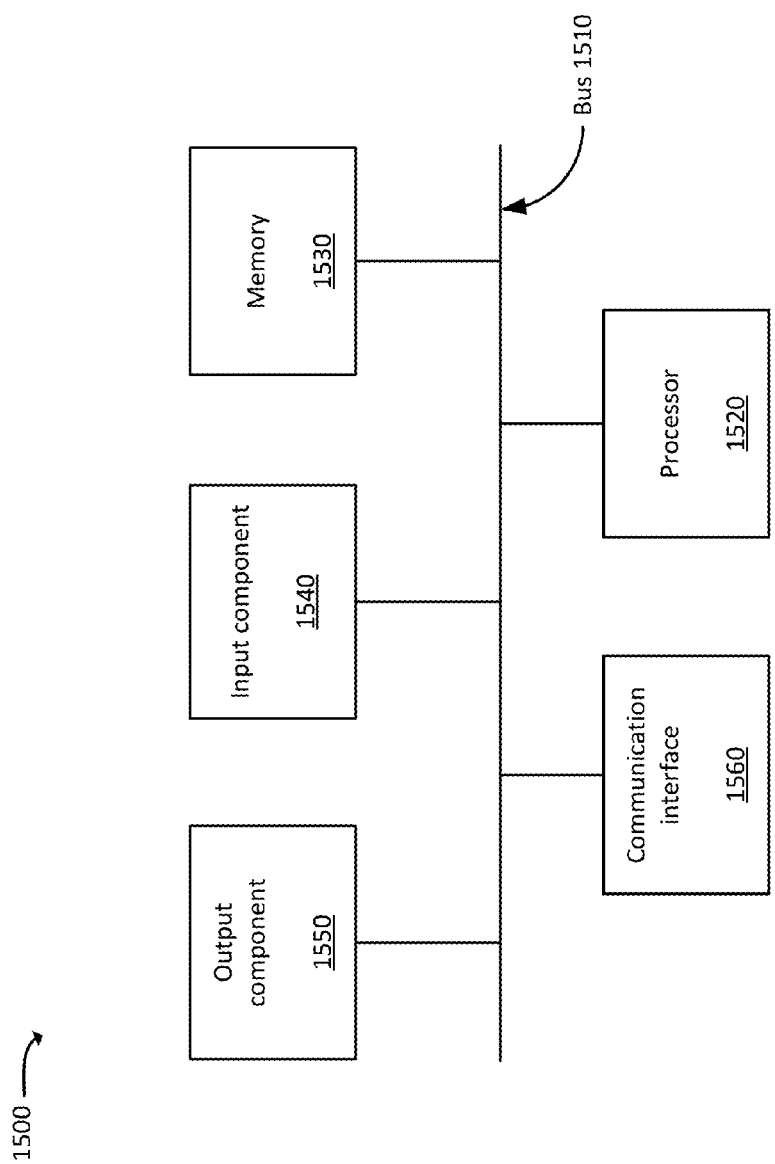
FIG. 15 illustrates example components of a device, in accordance with some implementations described herein.

FIG. 15 is a diagram of example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 5 and 7, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
a memory device storing a set of processor-executable instructions; and
a processor configured to execute the processor-executable instructions, wherein executing the processor-executable instructions causes the user device to:
identify a telephone number associated with a sender of a text message received by the user device from a message relay device;
determine a location identifier that is associated with the telephone number, wherein the location identifier includes at least one of:
a uniform resource locator ("URL"), or
an Internet protocol ("IP") address;
retrieve web content, from a content server, using the location identifier; and
concurrently present, via a display screen of the user device, the text message and the retrieved web content.

2. The user device of claim 1, wherein the text message is a first text message, wherein executing the processor-executable instructions further causes the user device to:
receive a second text message, inputted to the user device by a user of the user device;
reply to the first text message by sending the second text message, using the telephone number, to the sender of the first text message;
receive updated web content, that has been generated by the content server based on content of the second text message; and
present the updated web content.

3. The user device of claim 2, wherein executing the processor-executable instructions, to present the updated web content, further causes the user device to:
concurrently present the updated web content and the second text message.

4. The user device of claim 2,
wherein the updated web content includes secure or personal information, and
wherein the updated web content is presented without a request, from the content server, for authentication by a user of the user device.

5. The user device of claim 4, wherein the content server verifies an identity of the user device based on information that is included in the second text message and is verified by the message relay server.

6. The user device of claim 1, wherein executing the processor-executable instructions, to concurrently present the web content and the text message, further causes the user device to:
present the web content and the text message in a split screen user interface.

7. The user device of claim 1, wherein the text message includes at least one of:
a short message service ("SMS") message, or
a multimedia messaging service ("MMS") message.

8. The user device of claim 1, wherein executing the processor-executable instructions, to determine the location identifier that is associated with the telephone number, further causes the user device to:
query a repository that stores information linking telephone numbers to respective location identifiers.

9. A method, comprising:
receiving, by a user device, a text message;
identifying, by the user device, a telephone number associated with a sender of the text message;
determining, by the user device, a location identifier that is associated with the telephone number, wherein the location identifier includes at least one of:
a uniform resource locator ("URL"), or
an Internet protocol ("IP") address;
retrieving web content, from a content server, using the location identifier; and
concurrently presenting, via a display screen of the user device, the text message and the retrieved web content.

10. The method of claim 9, wherein the text message is a first text message, the method further comprising:
receiving a second text message, inputted to the user device by a user of the user device;
replying to the first text message by sending the second text message, using the telephone number, to the sender of the first text message;

receiving updated web content, that has been generated by the content server based on content of the second text message; and presenting the updated web content.

11. The method of claim 10, wherein presenting the updated web content comprises:

concurrently presenting the updated web content and the second text message.

12. The method of claim 10, wherein the updated web content includes secure or personal information, and wherein the updated web content is presented without a request, from the content server, for authentication by a user of the user device.

13. The method of claim 12, wherein the content server verifies an identity of the user device based on information that is included in the second text message and is verified by a message relay server.

14. The method of claim 9, wherein concurrently presenting the web content and the text message comprises:

presenting the web content and the text message in a split screen user interface.

15. The method of claim 9, wherein the text message includes at least one of:

a short message service ("SMS") message, or a multimedia messaging service ("MMS") message.

16. The method of claim 9, wherein executing the processor-executable instructions, to determine the location identifier that is associated with the telephone number, further causes the user device to:

query a repository that stores information linking telephone numbers to respective location identifiers.

17. A method, comprising:

receiving, by a content server and via a message relay server, information regarding a text message sent by a user device to a telephone number associated with the content server, the information including:

content of the text message, and an indication that an identity of the user device has been verified by the message relay server;

determining, by the content server, web content to provide to the user device, wherein the web content includes secure or personal content, the determining being based on the content of the text message and the indication that the identity of the user device has been verified; and outputting, by the content server, the web content to the user device, the outputting being performed without requesting authentication information, from a user of the user device, for the secure or personal content.

18. The method of claim 17, further comprising:

identifying a location identifier associated with the user device, wherein the web content is determined based on the location identifier associated with the user device.

19. The method of claim 18, wherein the location identifier includes at least one of:

a uniform resource locator ("URL"), or an Internet Protocol ("IP") address.

20. The method of claim 17, wherein the text message includes at least one of:

a short message service ("SMS") message, or a multimedia messaging service ("MMS") message.

* * * * *